Sept. 30, 1969   J. H. GARVEY   3,469,344
SPILE
Filed Aug. 7, 1967
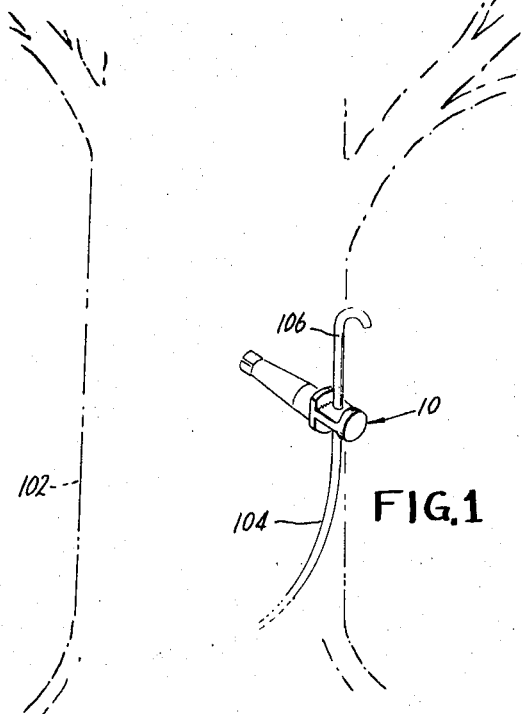
FIG.1
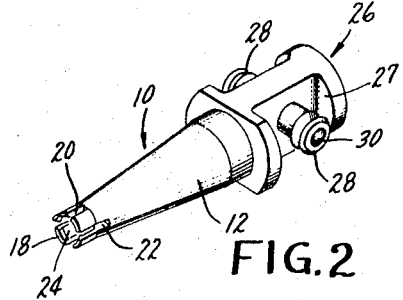
FIG.2
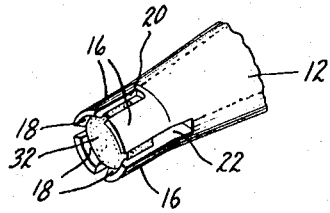
FIG.3
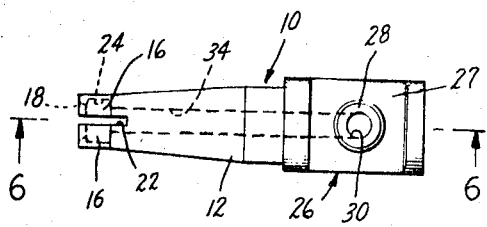
FIG.4
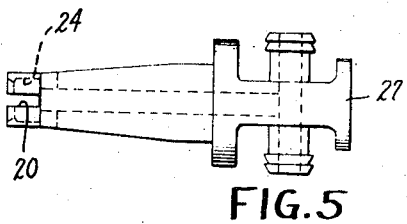
FIG.5
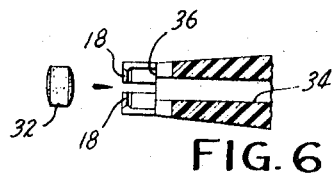
FIG.6
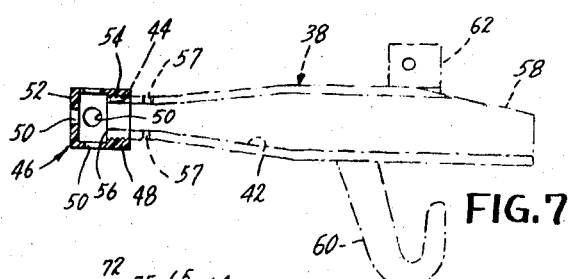
FIG.7
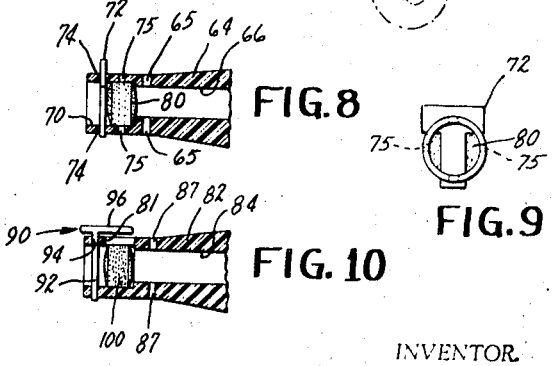
FIG.8
FIG.10
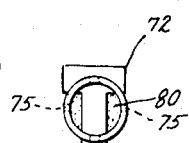
FIG.9
INVENTOR.
JOHN H. GARVEY
BY
ATTORNEY

United States Patent Office 3,469,344
Patented Sept. 30, 1969

3,469,344
SPILE
John H. Garvey, Union City, N.J., assignor to Custom Packaging, Inc., Newark, N.J., a corporation of New Jersey
Filed Aug. 7, 1967, Ser. No. 658,870
Int. Cl. A01g 23/10, 7/06
U.S. Cl. 47—53                                    18 Claims

ABSTRACT OF THE DISCLOSURE

There is disclosed a spile having a chamber at the end thereof which is insertable into a tap hole in the tree so that a pellet of a bactericide received therein will be in effective contact with the tissues of the tree about the tap hole. The pellet receiving chamber may be in the path or conduit for sap flowing through the spile so that it may provide some germicidal or fungicidal action upon the sap flowing through the spile.

Background of the invention

In the conventional method for collecting sap from maple trees and the like, a spile is inserted into a tap hole bored for that purpose in the trunk of the tree. A suitable vessel is provided for collecting the sap passing through the spile, and this may take the form of a pail positioned beneath a spout on the spile or a larger vessel at a location remote from the tree and connected to the spile by means such as tubing.

Because bacteria tend to attack the tissues of the sap producing tree through the tap hole, premature drying may occur to terminate the flow of sap, or even more permanent damage to the tree may be caused. Pellets of bactericides have been developed for insertion into the tap hole to provide some protection against bacterial growth.

In addition, there is a tendency for the sap collected to develop fungicidal or bacterial growth which can reduce the quality and quantity of sap sold by the sap producer. Various fungicides have been proposed for addition to the maple syrup products to minimize such growths after packaging thereof.

Accordingly, it is an object of the present invention to provide convenient and effective means for treating the tap hole during the collection of sap therefrom to prevent premature drying of the tissues about the tap hole.

A specific object of the present invention is to provide a spile which will expose the tissues about the tap hole and the sap to a chemical treating agent contained within the spile and inserted therewith.

A further object is to provide a unitary spile which may be simply and economically fabricated and which is adapted to permit facile replacement of a pellet of bactericide or the like.

Summary of the invention

It has now been found that the foregoing and related object can be readily obtained in a spile having one end dimensioned and configured for insertion into a tap hole in a tree. The spile has a conduit extending therethrough with an inlet end at the insertable end portion of the spile and an outlet end spaced therefrom through which the sap may be discharged. Retaining means on the spile at the insertable end provides a chamber communicating with the exterior surface of the insertable end portion, and this chamber is adapted to receive the pellet of chemical agent for gradual release into contact with the tissues of the tree while permitting the flow of sap through the conduit.

Normally, the spile will include a body portion or member providing a conduit and retaining means at one end of the body portion to define the chamber for receiving the pellet either at the inlet end of the conduit or adjacent thereto. Thus, the chamber may be in the path of flow of sap through the spile, either fully or partially, such as by providing additional inlets to the conduits at a point spaced downstream thereof.

The retaining means may assume a variety of forms and is conveniently provided by integrally formed, axially extending fingers projecting from the insertable end of the spile. These fingers are resiliently deflectable so as to receive therebetween a pellet of chemical agent and provide the chamber for retaining the pellet in cooperation with the adjacent end of the body portion. Such fingers may have radially inwardly extending projections at the free end thereof to positively locate the pellet within the chamber provided thereby.

Alternatively, a portion of the conduit may be utilized to provide the pellet receiving chamber by use of a displaceable closure which will seal the conduit, or a separate cavity or aperture in the spile may be disengageably sealed by a suitable closure member. The mouth of the cavity which provides the chamber should open either radially or axially with respect to the longitudinal axis of the spile, depending upon the particular closure to be employed. An upwardly opening cavity can be molded or cut into the spile in a separate operation, and an axially opening cavity of chamber can be formed by enlarging the diameter of the conduit at the inlet end portion.

The displaceable closure member which is utilized to form a pellet retaining chamber in cooperation with the cavity may assume numerous configurations. When the cavity opens radially, it is convenient to use a closure member having an axially extending head portion adapted to overlie the opening and a depending shank portion insertable into an aperture in the spile. When the cavity opens axially, use of a closure member to partially block the mouth of the cavity is desirable such as a gate or pin insertable into an aperture in the spile adjacent the mouth of the cavity.

Generally the spile will have the conduit therethrough principally extending in the longitudinal axis of the spile. In addition, the spile will most usually have an insertable end portion of reduced diameter expanding into a larger portion so as to facilitate molding and increase strength.

Generally the conduit will have a relatively narrow cross section adjacent the inlet end and expand downstream thereof so as to facilitate the flow of sap through the conduit. In addition to the retaining means, the spile may have other elements associated therewith such as one or more nipples at the outlet end of the conduit. Such nipples will have apertures therein extending into the conduit and may, in fact, be the outlets for the conduits. In accordance with one form of spile, flexible tubing is attached to one of the nipples and carries the sap therefrom to a central connection station at a point spaced from the trees. Another nipple will serve as a vent and may have a constricted piece of tubing affixed thereto so as to minimize the likelihood of entry of bacteria, dirt and the like.

The spile may also have other elements such as a hook for suspending a pail in position beneath the outlet of the conduit, or projections about the body thereof for locking the spile within the tree through enhanced frictional engagement. In addition, a spout may be formed on the spile to protect the outlet where nipples are not employed.

Although the spile is most desirably integrally formed from synthetic plastic or the like by injection molding or compression molding, it will be appreciated that the various elements of the spile may be separately fabricated. In addition, a conventional spile may be adapted to the present invention by use of suitable retaining means engageable at the insertable end portion of the spile, the retaining means providing a chamber for retaining the pellet while at the same time permitting the flow of sap through the conduit and the spile.

As will be appreciated, the spile of the present invention permits the pellet chemical agent to be inserted into the chamber prior to placing the spile within the tap hole of the tree. During use of the spile, the chemical agent will slowly come into contact with the tissues about the tap hole so as to provide the necessary bactericidal action therefor. Generally, the chemical agents are slowly volatilizable materials such as a para-formaldehyde. Over an extended period of time, the chemical agent volatilizes slowly in the chamber by reason of the constrictions and passes outwardly of the spile. In addition, sap flows thereabout will tend to produce a solution of the chemical agent therein so as to provide a bactericidal or fungicidal action in the sap being collected from the trees.

The period of activity for a pellet of chemical agent will, of course, vary with the chemical composition thereof, its size and the nature of the aperture providing the communication between the pellet receiving chamber of the retaining means and the exterior surface of the spile. As required, the spile may be withdrawn from the tap hole, a new pellet inserted and the spile replaced to provide continuing activity.

Brief description of the drawing

FIGURE 1 is a perspective view of a spile embodying the present invention as assembled to a tree and tubing shown in phantom line;

FIGURE 2 is a perspective view of the spile of FIGURE 1 to an enlarged scale;

FIGURE 3 is a fragmentary perspective view to an enlarged scale of the insertable end portion of the spile of FIGURE 1;

FIGURE 4 is a plan view of the spile of FIGURE 1;

FIGURE 5 is a side elevational view thereof;

FIGURE 6 is a fragmentary sectional view thereof along line 6—6 of FIGURE 4 showing the retaining means and also illustrating the insertion of a pellet thereinto;

FIGURE 7 is a side elevational view of another embodiment of the spiles of the present invention;

FIGURE 8 is a fragmentary sectional view of another spile employing another type of retaining means;

FIGURE 9 is an end view of the retaining means of the embodiment of FIGURE 8; and FIGURE 10 is a further embodiment of the spile using still another variation of retaining means.

Description of the preferred embodiments

Turning now to FIGURES 1–6 of the attached drawing in detail, there is illustrated a preferred embodiment of the present invention wherein a spile generally designated by the numeral 10 has a body portion 12 and retaining means at one end thereof generally designated by the numeral 14. The retaining means 14 is provided by a plurality of resiliently deflectable fingers 16 extending axially from the body portion 12 and spaced about the circumference thereof to provide slots 20, 22 therebetween. Each of the fingers 16 has a radially inwardly extending projection 18 at its free end which is bevelled inwardly to facilitate insertion of a pellet 32 of chemical agent therebetween. As will be appreciated, a chamber 24 for receiving the pellet 32 is defined by the plurality of figures 16 with end inward projections 18 in cooperation with the adjacent end of the body portion 12 which provides a shoulder 36.

The spile 10 has a flow directing element or portion generally designated 26 at its outer end, i.e., the end opposite the insertable end having the retaining means 14. The flow directing element 26 has a trunk portion 27 and nipples 28 projecting perpendicularly to the longitudinal axis of the spile 10 and which have channels 30 therein in communication with the central passage 34 through the spile 10 as is best seen in FIGURE 5.

The slots 22 are of greater axial length than the slots 20 and extend beyond the chamber 24 into the body portion 12. When the spile 10 is inserted into a tap hole in the tree 102, the end portion including the full length of the slots 22 is within the tap hole.

Thus, with a pellet 32 filling the chamber 24, the conduit or path for sap through the spile 10 is through the slots 22 into the axial passage 34 and thence outwardly through the channel 30 in one of the nipples 28. Subsequently, the sap may also flow into the chamber 24 through the slots 20 and thence into the axial passage 34. A tube 104 is fitted upon the downwardly extending nipple 28 to conduct the sap to a central collection vessel (not shown). A short length of tubing 106 bent upon itself to restrict the passage of bacteria therethrough is fitted on the upwardly extending nipple 28 to act as a vent for the system.

FIGURE 6 diagrammatically illustrates the method for placing the pellet 32 within the chamber 24. The pellet 32 is forced against the bevelled edges of the inwardly projections 18 of the deflectable fingers 16, thus causing them to spread about and permit the pellet 32 to pass therebetween into the chamber 24.

Turning now to FIGURE 7 of the attached drawing there is illustrated another spile embodying the present invention which has a body member and a cap member generally designated by the numerals 38 and 46 respectively. The body member 38 has a tapered bore or passage 42 therethrough with a relatively small diameter inlet end and a threaded portion 44 thereabout. The cap has a cooperating threaded portion 48 on the sidewall 54 thereof and a multiplicity of apertures 50 are provided in the cap 46 in the end wall 52 thereof as well as in the sidewall 54 above the threaded end portion. The sidewall of the cap is of sufficient axial length above the threaded end portion 48 so as to provide a chamber 55 therewithin for receiving the pellet 32 in cooperation with the shoulder portion 56 body member 38. The vapors released by the pellet 32 are free to pass outwardly through the apertures 50 into contact with the tissues of the tree.

In this particular embodiment the body member 38 also has one or more apertures 57 in the sidewall thereof adjacent to the cap 46 for passage of sap into the conduit 42 extending therethrough. A flow directing element in the form of a spout 58 is provided by the configuration of the body member 38 at the outlet end of the conduit 42. A hook 60 is formed on the underside of the body member 38 to support a pail or bucket (not shown) beneath the spout 58 to collect the sap issuing thereform. The spile also has an upwardly extending arm 62 by which it can be more fully supported by the tree to accommodate the added weight of the bucket and collected sap.

FIGURES 8–10 illustrate spiles embodying the present invention wherein the retaining means is a cavity at the inlet end of the conduit. In the embodiment of FIGURES 8 and 9, the body member 64 has a conduit 66 extending therethrough with an enlarged or counter-bored end portion providing a cavity 70 opennig axially of the spile. A gate or closure member 72 of generally T-shaped configuration is received in cooperating radial slots 74 so as to retain the pellet 80 of chemical agent in the chamber or cavity. Apertures 75 about the periphery of the chamber portion of the body member provide communication between the chamber 70 and the exterior surface of the spile to permit the chemical agent to operate and, the gate member 72 may be dimensioned so as to permit communication thereabout through the axial opening. In addition, the body member 64 has a plurality of apertures 65 spaced thereabout downstream from the cavity 70 to permit the sap to flow rapidly into the conduit 66.

In the embodiment of FIGURE 10, a secantal slot 81 has been milled into the inlet end of the body member 82 of sufficient width so as to receive the pellet 100. To retain the pellet 100 within the chamber 85 thus formed, a closure member generally designated by the numeral 90 has a shank portion 92 which is seated in an aperture 94 formed adjacent the end of the body member 82. The closure member 90 has a head of sufficient dimention so as to overlie the secantal slot 81. The body member 82 is also provided with a plurality of apertures 87 downstream of the pellet 100 for passage of sap freely into the conduit 84 therethrough.

Thus it can be seen that the present invention provides a convenient and effective means for treating the tap hole during the collection of sap therefrom to prevent premature drying of the tissues about the tap hole. The spiles of the present invention are simply and economically fabricated and are adapted to permit facile replacement of a pellet of bactericide or the like. The pellets of treating agent are so maintained within the spiles so as to protect them from crushing action during insertion of the spile into the tap holes and to facilitate the slow release of the chemical agent into contact with the tree tissues and into contact with sap flowing into the spile where such is desired. Thus, highly effective treating action can be obtained while at the same time permitting relatively unimpeded flow of the sap through the spile.

Having thus described the invention, I claim:

1. A spile having an insertable end portion dimensioned and configured for insertion into a tap hole in a tree and a conduit extending therethrough with an inlet end at said insertable end portion and an outlet end spaced therefrom, said spile having a body member through which said conduit extends and retaining means adjacent said inlet end providing a chamber communicating with the outer surface of said insertable end portion and adapted to receive a pellet of chemical agent for release and contact with the interior of the tree and permitting the sap to flow through said conduit, said retaintaining means comprising a plurality of flexible fingers projecting axially from the periphery of said body member about the inlet end of said condut and providing said insertable end portion of said spile, said fingers having radially inwardly extending projections adjacent the free ends thereof to provide said chamber in cooperation with the adjacent end of said body portion.

2. The spile of claim 1 wherein said spile is integrally formed.

3. The spile of claim 1 wherein a flow-directing element is provided a said body member at the outlet end of said conduit.

4. The spile of claim 3 wherein said flow-directing element is integrally formed on said body member.

5. The spile of claim 3 wherein said flow-directing element is a spout, and wherein a hook is additionally provided on said body member to support a receptacle under said spout.

6. The spile of claim 3 wherein said flow-directing element comprises at least one nipple for receiving the open end of a collecting tube and a channel provided through said nipple communicates with said conduit.

7. A spile having an insertable end portion dimensioned and configured for insertion into a tap hole in a tree and a conduit extending therethrough with an inlet end at said insertable end portion and an outlet end spaced therefrom, said spile having a body member through which said conduit extends and retaining means adjacent said inlet end providing a chamber communicating with the outer surface of said insertable end portion and adapted to receive a pellet of chemical agent for release and contact with the interior of the tree and permitting the sap to flow through said conduit, said retaining means being provided by the cooperation of said chamber and a cap member on the inlet end of said body member, said cap member having an opening in its end wall and said body member and cap member having interengaging means thereon for disengageable assemmbly thereof.

8. The spile of claim 7 wherein said interengaging means comprises a threaded portion on said body member adjacent said inlet end thereof and a cooperating threaded portion on the sidewall of said cap spaced from said end wall.

9. The spile of claim 7 wherein said interengaging means comprises an annular projection on one of said body and cap members and a cooperating recess in the surface of the other of said body and cap members.

10. The spile of claim 7 wherein a flow-directing element is provided on said body member at the outlet end of said conduit.

11. The spile of claim 10 wherein said flow-directing element is a spout, and wherein a hook is additionally provided on said body member to support a receptacle under said spout.

12. The spile of claim 10 wherein said flow-directing element comprises at least one nipple for receiving the open end of a collecting tube and a channel provided through said nipple communicates with said conduit.

13. A spile having an insertable end portion dimensioned and configured for insertion into a tap hole in a tree and a conduit extending therethrough with an inlet end at said insertable end portion and an outlet end spaced therefrom, said spile having a body member through which said conduit extends and retaining means adjacent said inlet end providing a chamber communicating with the outer surface of said insertable end portion and adapted to receive a pellet of chemical agent for release and contact with the interior of the tree and permitting the sap to flow through said conduit, said body member providing said conduit and an enlarged conduit portion adjacent the inlet end thereof with a mouth opening to the exterior of said body member, said retaining means being provided by a closure member releasably engaged with the inlet end of said body member in cooperation with said enlarged conduit portion, said closure member extending at least partially across said mouth to cooperate in defining said chamber.

14. The spile of claim 13 wherein said mouth opens in a direction generally perpendicular to the axis of said conduit.

15. The spile of claim 13 wherein said mouth opens in a direction generally parallel to the axis of said conduit.

16. The spile of claim 13 wherein a flow-directing element is provided on said body member at the outlet end of said conduit.

17. The spile of claim 16 wherein said flow-directing element is a spout, and wherein a hook is additionally provided on said body member to support a receptacle under said spout.

18. The spile of claim 16 wherein said flow-directing element comprises at least one nipple for receiving the open end of a collecting tube and a channel provided through said nipple communicates with said conduit.

References Cited

UNITED STATES PATENTS

| | | | |
|---|---|---|---|
| 778,031 | 12/1904 | Grimm | 47—51 |
| 1,751,524 | 3/1930 | Moss | 239—315 |
| 2,785,011 | 3/1957 | Albano | 239—314 |
| 2,986,340 | 5/1961 | Webb | 239—315 |
| 3,008,650 | 11/1961 | Prokop | 239—315 |
| 3,046,698 | 7/1962 | Breen et al. | 47—52 |
| 3,057,115 | 10/1962 | Bilanin | 47—52 |
| 3,180,579 | 4/1965 | Tomaso | 239—314 |

ROBERT E. BAGWILL, Primary Examiner

U.S. Cl. X.R.

137—268; 239—315